(12) United States Patent
Adams (10) Patent No.: US 11,503,943 B2
(45) Date of Patent: Nov. 22, 2022

(54) BABY FORMULA MIXING ASSEMBLY (71) Applicant: J' Naye Adams, Upper Marlboro, MD (US)

(72) Inventor: J' Naye Adams, Upper Marlboro, MD (US)

( * ) Notice: Subject to any disclaimer, the term of this patent is extended or adjusted under 35 U.S.C. 154(b) by 798 days.

(21) Appl. No.: 16/509,050

(22) Filed: Jul. 11, 2019

(65) Prior Publication Data

US 2021/0007541 A1    Jan. 14, 2021

(51) Int. Cl.
  *A47J 31/00*   (2006.01)
  *A47J 31/40*   (2006.01)
  *A47J 36/24*   (2006.01)
  *A47J 31/44*   (2006.01)
  *B01F 23/50*   (2022.01)
  *A47J 31/56*   (2006.01)
  *H04M 1/72415* (2021.01)
  *B01F 101/14*  (2022.01)

(52) U.S. Cl.
  CPC .......... *A47J 31/401* (2013.01); *A47J 31/404* (2013.01); *A47J 31/4403* (2013.01); *A47J 36/2433* (2013.01); *B01F 23/50* (2022.01); *A47J 31/56* (2013.01); *B01F 23/56* (2022.01); *B01F 2101/14* (2022.01); *H04M 1/72415* (2021.01)

(58) Field of Classification Search
  None
  See application file for complete search history.

(56) References Cited

U.S. PATENT DOCUMENTS

| | | | |
|---|---|---|---|
| 5,570,816 A | 11/1996 | LaBarbera, Jr. | |
| 6,170,386 B1 * | 1/2001 | Paul | A47J 36/2433 99/275 |
| 6,766,106 B2 | 7/2004 | Roberson | |
| 6,829,431 B1 | 12/2004 | Haven | |
| D534,028 S | 12/2006 | Artis | |
| 2008/0160153 A1 | 7/2008 | Hestekin | |
| 2011/0209625 A1 | 9/2011 | Kang | |
| 2018/0070760 A1 * | 3/2018 | Herbert | A47J 31/4403 |

* cited by examiner

Primary Examiner — Anshu Bhatia (57) ABSTRACT

A baby formula mixing assembly includes a housing and a control circuit that is coupled to the housing. A liquid reservoir is positioned within the housing to contain the liquid. A formula reservoir is positioned within the housing to contain baby formula. A mixing chute is positioned within the housing to receive a selected amount of baby formula and a selected amount of liquid for mixing together. A pump is positioned within the housing to pump the mixture of baby formula and liquid. A dispensing unit is movably coupled to the housing and the dispensing unit is in fluid communication with the pump. A carousel is rotatably coupled to the housing for sequentially rotating baby bottles to align each of the baby bottles with the dispensing unit to fill the baby bottles with the mixture of formula and liquid.

16 Claims, 7 Drawing Sheets

BABY FORMULA MIXING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to mixing devices and more particularly pertains to a new mixing device for PURPOSE.

BRIEF SUMMARY OF THE INVENTION

An embodiment of the disclosure meets the needs presented above by generally comprising a housing and a control circuit that is coupled to the housing. A liquid reservoir is positioned within the housing to contain the liquid. A formula reservoir is positioned within the housing to contain baby formula. A mixing chute is positioned within the housing to receive a selected amount of baby formula and a selected amount of liquid for mixing together. A pump is positioned within the housing to pump the mixture of baby formula and liquid. A dispensing unit is movably coupled to the housing and the dispensing unit is in fluid communication with the pump. A carousel is rotatably coupled to the housing for sequentially rotating baby bottles to align each of the baby bottles with the dispensing unit to fill the baby bottles with the mixture of formula and liquid.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
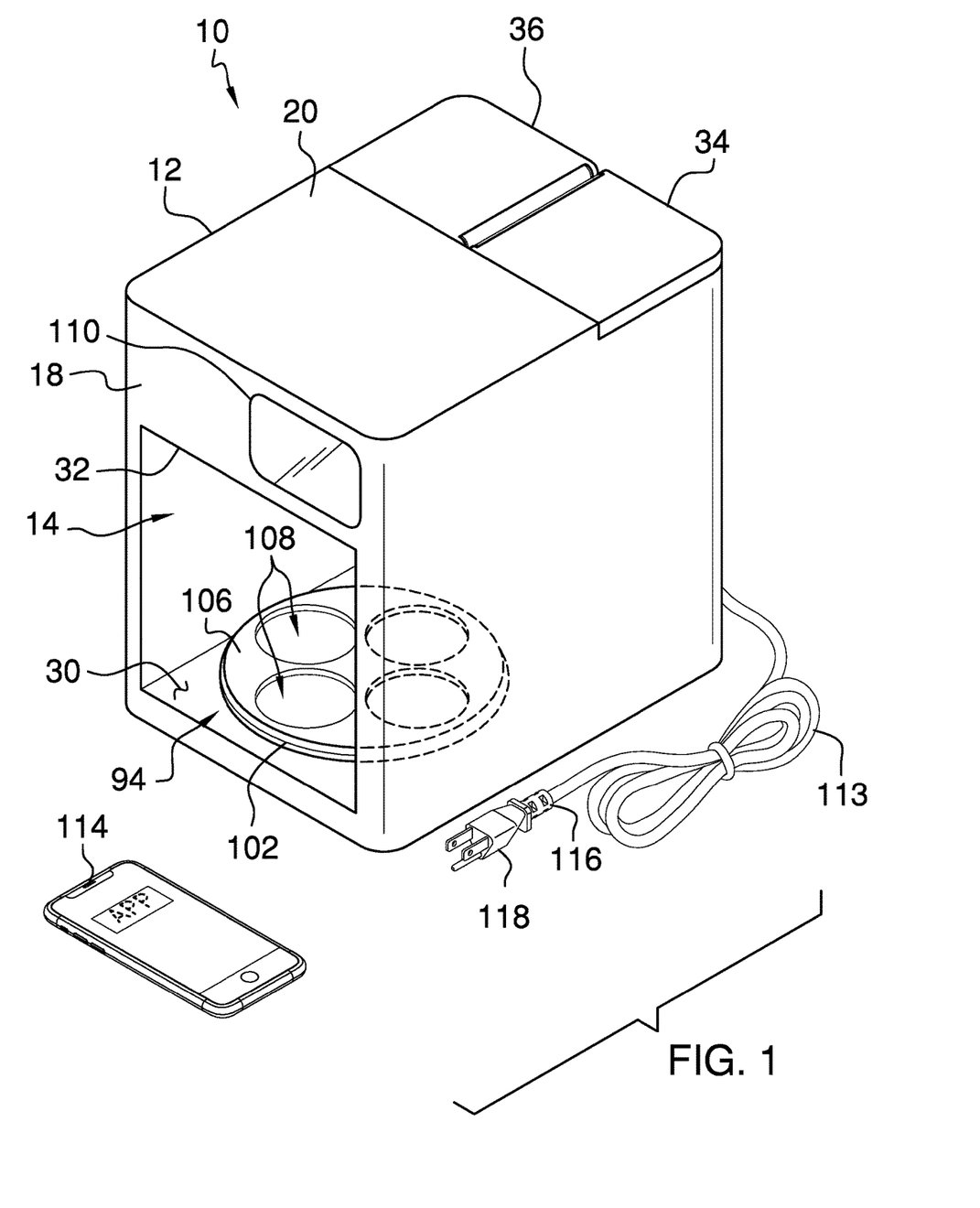
FIG. 1 is a top perspective view of a baby formula mixing assembly according to an embodiment of the disclosure.
Figure 2:
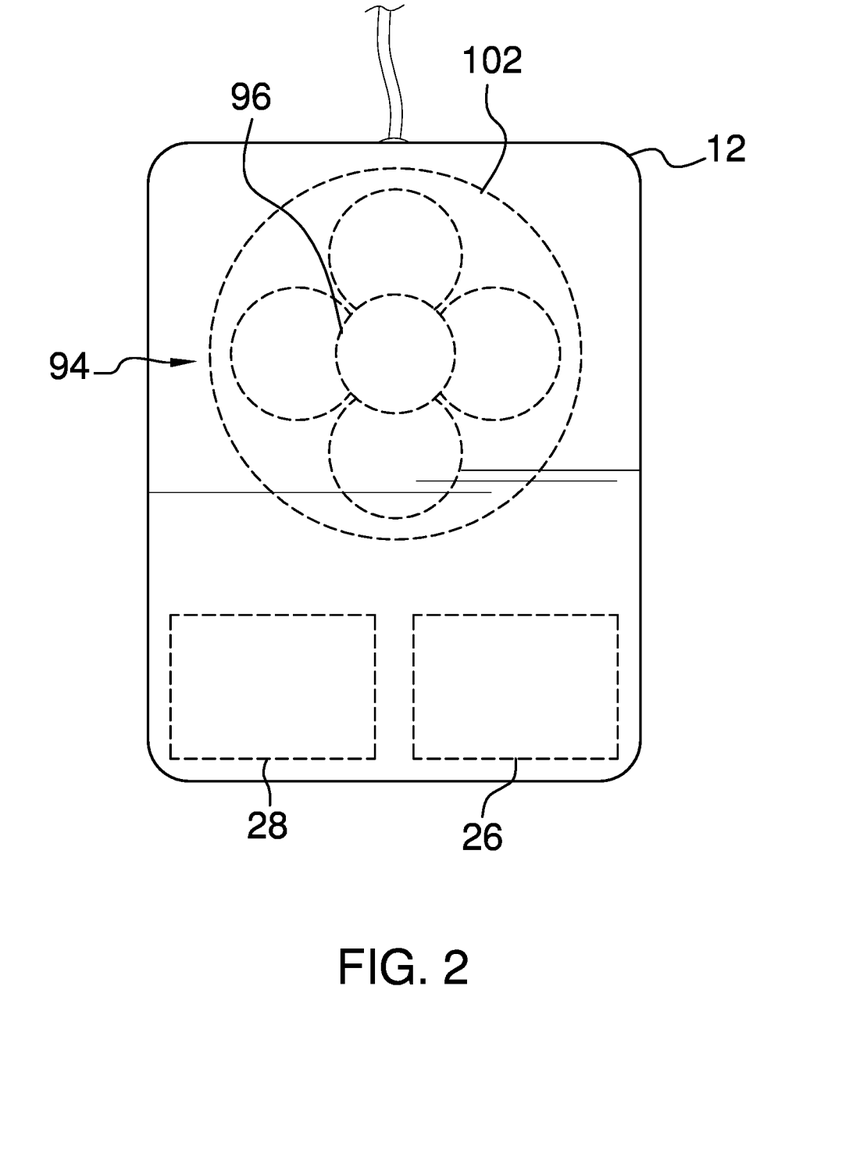
FIG. 2 is a bottom phantom view of an embodiment of the disclosure.
Figure 3:
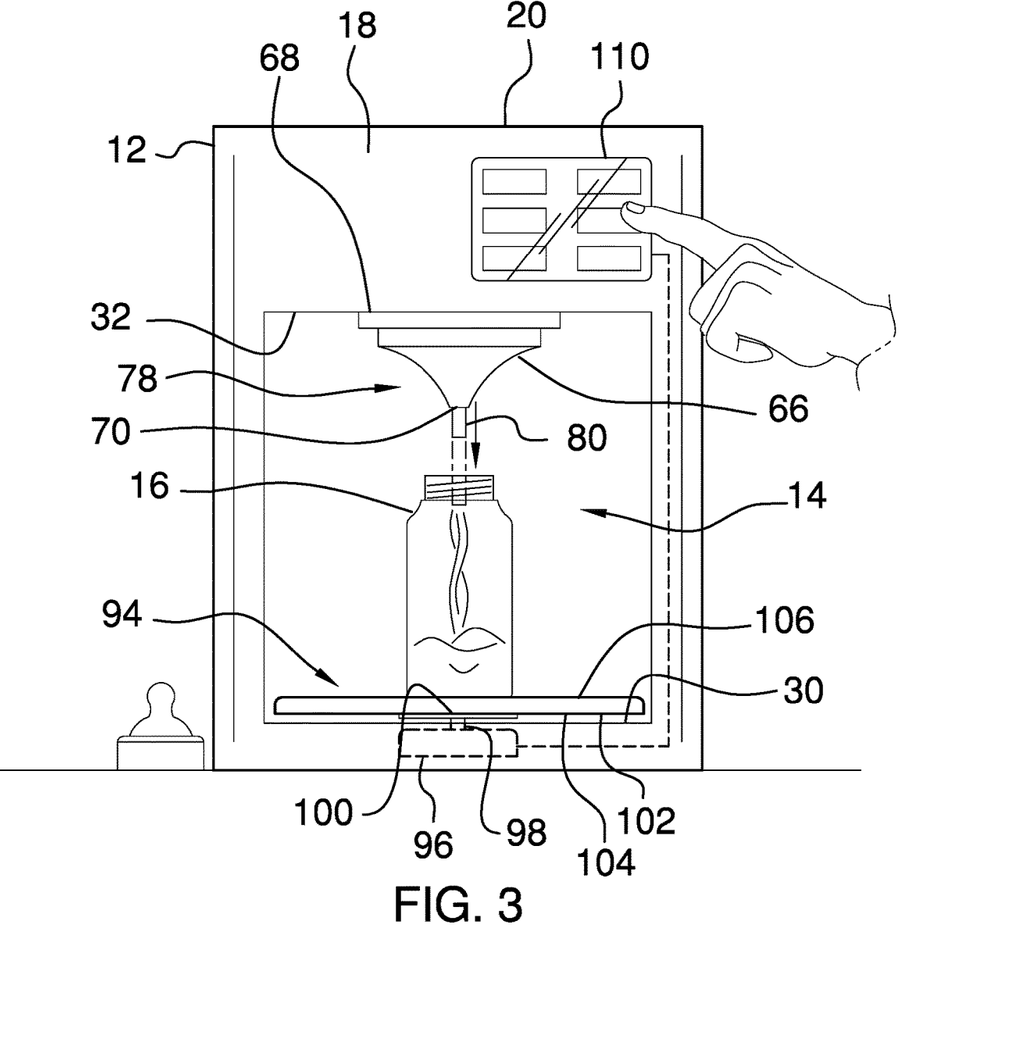
FIG. 3 is a front in-use view of an embodiment of the disclosure.
Figure 4:
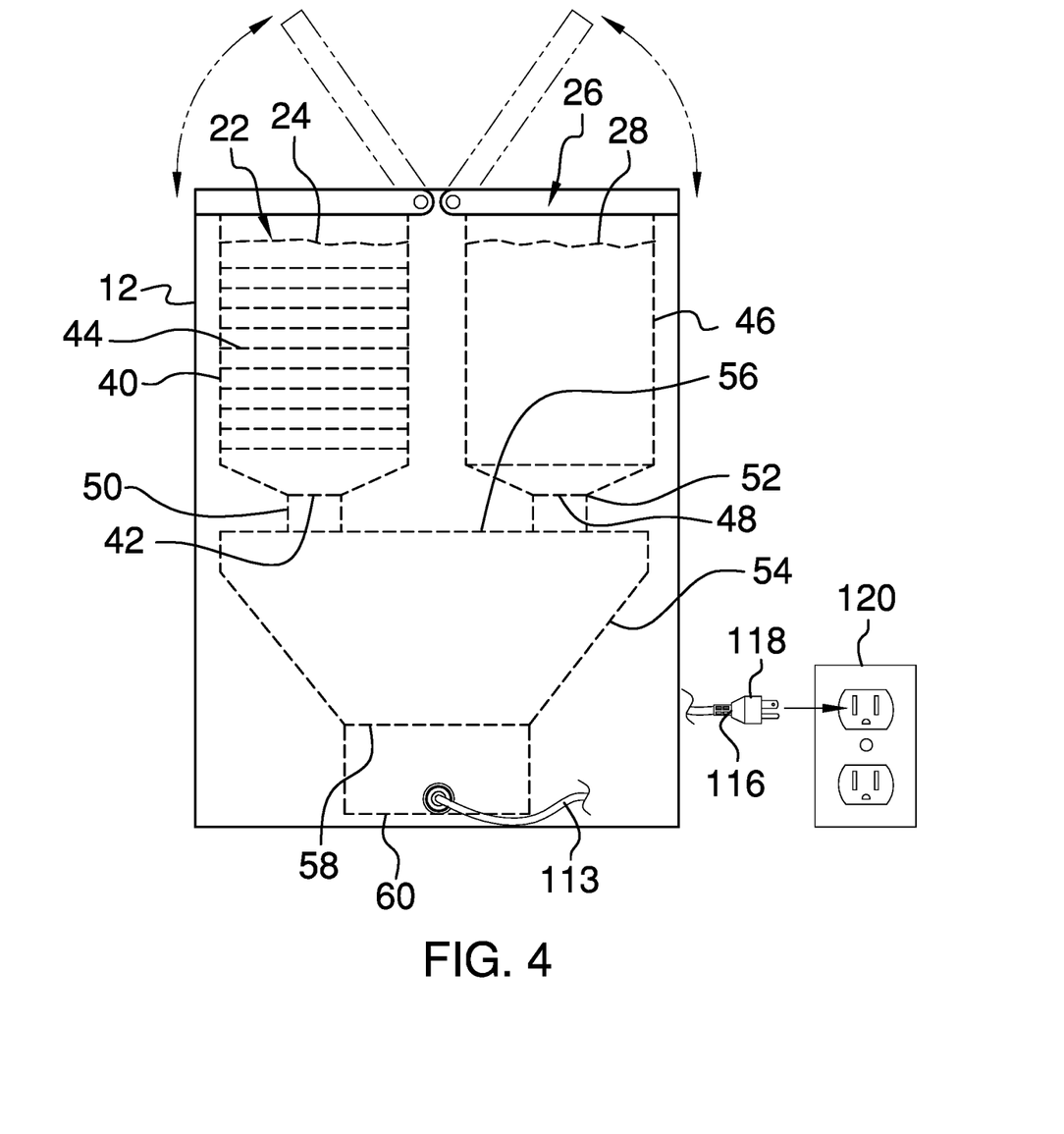
FIG. 4 is a back phantom view of an embodiment of the disclosure.
Figure 5:
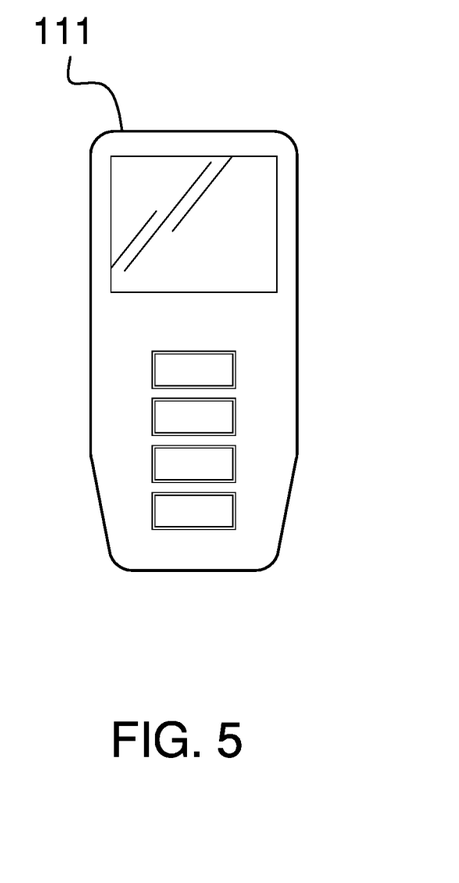
FIG. 5 is a perspective view of a remote control of an embodiment of the disclosure.
Figure 6:
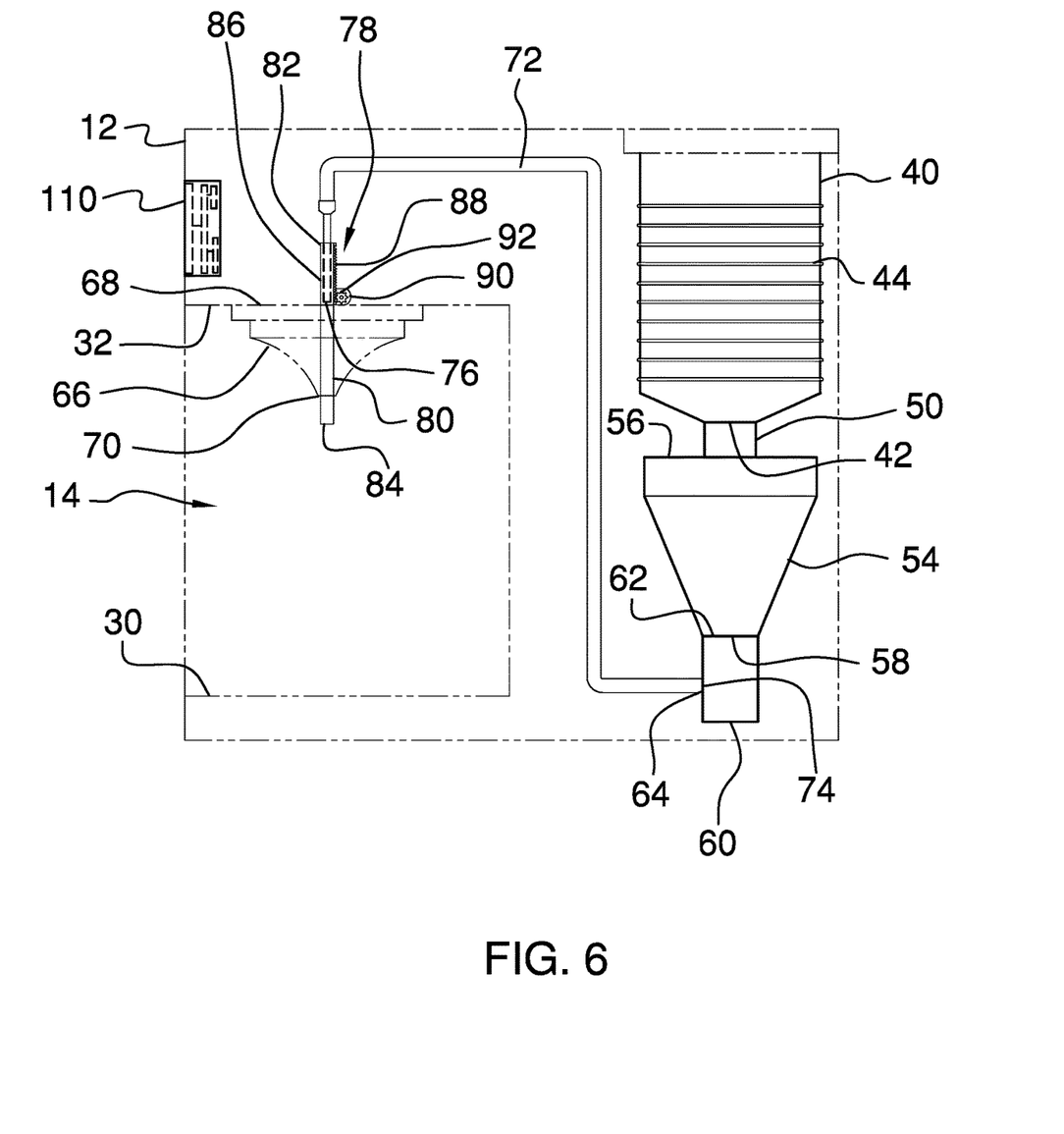
FIG. 6 is a left side cut away view of an embodiment of the disclosure.
Figure 7:
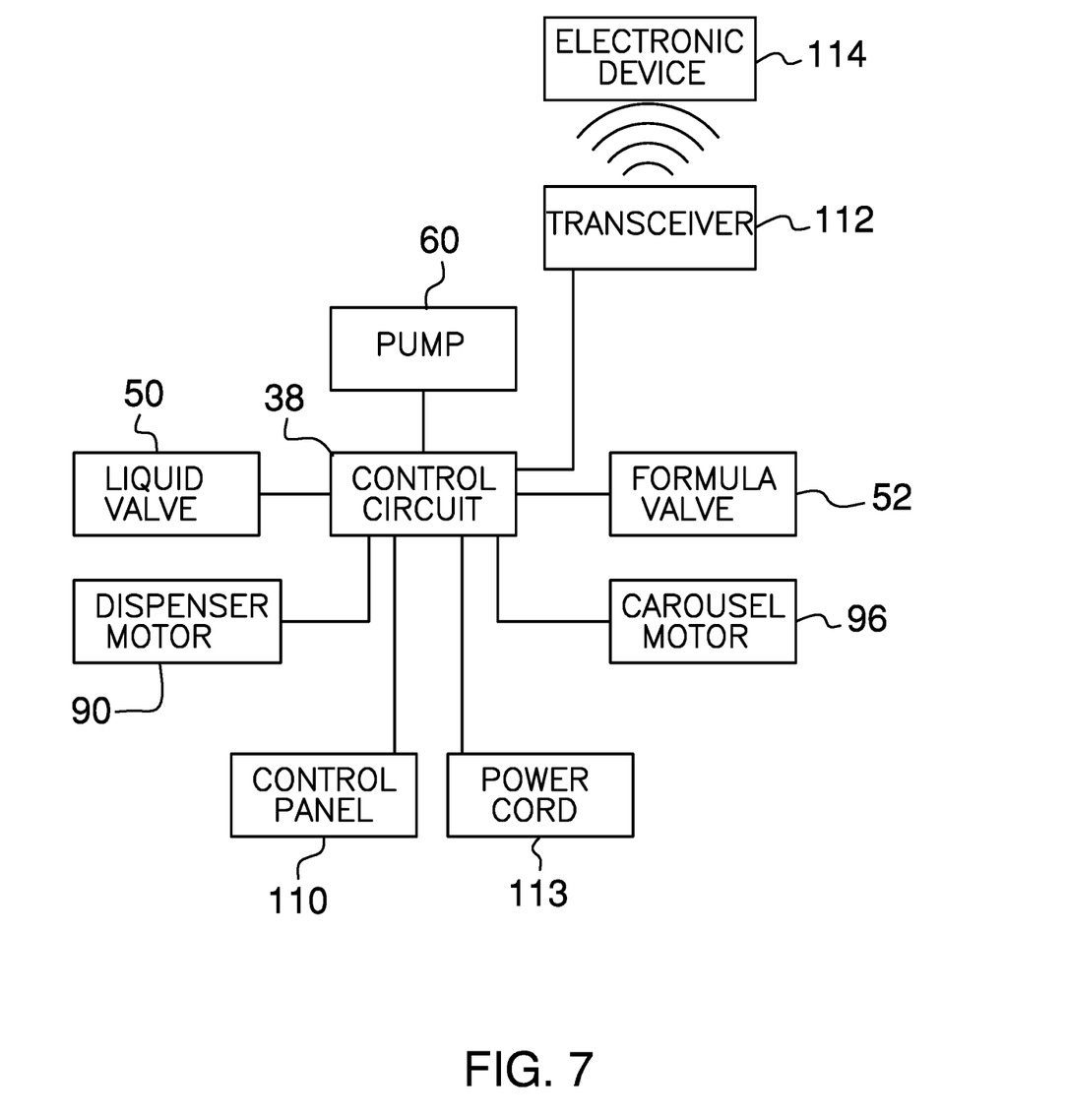
FIG. 7 is a schematic view of an embodiment of the disclosure.

With reference now to the drawings, and in particular to FIGS. 1 through 7 thereof, a new mixing device embodying the principles and concepts of an embodiment of the disclosure and generally designated by the reference numeral 10 will be described.

As best illustrated in FIGS. 1 through 7, the baby formula mixing assembly 10 generally comprises a housing 12 having a bottle bay 14 therein to receive a plurality of baby bottles 16. The baby bottles 16 may be feeding bottles of any conventional design for infants. The housing 12 has a front wall 18 and a top wall 20, and the bottle bay 14 extends into the front wall 18. The top wall 20 has a liquid opening 22 extending into an interior of the housing 12 to have liquid 24, such as water, poured therethrough. The top wall 20 has a formula opening 26 extending into the interior of the housing 12 to have baby formula 28, such as powered baby formula, poured therethrough.

The bottle bay 14 has a lower bounding surface 30 and an upper bounding surface 32. A liquid lid 34 is hingedly coupled to the top wall 20 of the housing 12 and the liquid lid 34 is aligned with the liquid opening 22 for opening and closing the liquid opening 22. A formula lid 36 is hingedly coupled to the top wall 20 of the housing 12 and the formula lid 36 is aligned with the formula opening 26 for opening and closing the formula opening 26. A control circuit 38 is coupled to the housing 12.

A liquid reservoir 40 is positioned within the housing 12. The liquid reservoir 40 is aligned with the liquid opening 22 to contain the liquid 24 and the liquid reservoir 40 has an output 42. A heating element 44 is coupled to the liquid reservoir 40 and the heating element 44 is in thermal communication with the liquid reservoir 40. The heating element 44 is electrically coupled to the control circuit 38 and the heating element 44 heats the liquid reservoir 40 when the heating element 44 is turned on thereby heating the liquid 24 in the liquid reservoir 40. The heating element 44 may be an electric heating coil that has an operational temperature ranging between approximately 90.0 degrees Fahrenheit and 100.0 degrees Fahrenheit. Thus, the heating element 44 cannot heat the liquid 24 to a temperature that could potentially be dangerous to the infant.

A formula reservoir 46 is positioned within the housing 12. The formula reservoir 46 is aligned with the formula opening 26 to contain the baby formula 28, and the formula reservoir 46 has an output 48. A liquid valve 50 is fluidly coupled to the output 42 of the liquid reservoir 40 and the liquid valve 50 is electrically coupled to the control circuit 38. The liquid valve 50 is in a normally closed state to retain the liquid 24 in the liquid reservoir 40. Moreover, the liquid valve 50 is turned on to open for a pre-determined amount of time. In this way the liquid valve 50 can release a selected amount of the liquid 24 from the liquid reservoir 40.

A formula valve 52 is fluidly coupled to the output of the formula reservoir 46 and the formula valve 52 is electrically coupled to the control circuit 38. The formula valve 52 is in a normally closed state to retain the baby formula 28 in the formula reservoir 46. Additionally, the formula valve 52 is turned on to open for a pre-determined amount of time. In this way the formula valve 52 can release a selected amount of the baby 28 formula from the formula reservoir 46. Each of the liquid valve 50 and the formula valve 52 may be electrically controlled valves of any conventional design.

A mixing chute 54 is positioned within the housing 12, the mixing chute 54 has an inlet 56 and an outlet 58, and the mixing chute 54 tapers between the inlet 56 and the outlet 58. The inlet 56 is aligned with each of the liquid valve 50 and the formula valve 52 such that the mixing chute 54 receives the selected amount of baby formula 28 and the selected amount of liquid 24 for mixing together. A pump 60 is positioned within the housing 12 and the pump 60 is electrically coupled to the control circuit 38. The pump 60 has an input 62 and an output 64, and the input 62 is fluidly coupled to the outlet 58 of the mixing chute 54. The pump 60 urges the mixture of baby formula 28 and liquid 24 outwardly through the output 64 of the pump 60 when the pump 60 is turned on. Additionally, the pump 60 may be an electric fluid pump or the like.

A funnel 66 is coupled to the housing 12 and the funnel 66 is directed into the bottle bay 14 thereby facilitating the funnel 66 to be aligned with the baby bottles 16. The funnel 66 has an upper end 68 and a lower end 70, and the upper end 68 is positioned on the upper bounding surface 32 of the bottle bay 14 having the lower end 70 being directed downwardly. A conduit 72 is provided and the conduit 72 has a first end 74 and a second end 76. The conduit 72 is positioned within the housing 12 and the first end 74 is fluidly coupled to the output 64 of the pump 60. The second end 76 is spaced from the upper end 68 of the funnel 66 such that the conduit 72 directs the mixture of baby formula 28 and liquid 24 to the funnel 66.

A dispensing unit 78 is movably positioned in the funnel 66 and the dispensing unit 78 is electrically coupled to the control circuit 38. The dispensing unit 78 is in fluid communication with the pump 60 such that the dispensing unit 78 receives the mixture of baby formula 28 and liquid 24. Moreover, the dispensing unit 78 is turned on to extend downwardly from the funnel 66 and subsequently enter the baby bottle 16 that is aligned with the funnel 66. In this way the dispensing unit 78 can fill the baby bottle 16 with the mixture of baby formula 28 and liquid 24 without spillage. The dispensing unit 78 is turned off to retract upwardly into the funnel 66 thereby inhibiting the dispensing unit 78 from engaging the baby bottles 16.

The dispensing unit 78 comprises a tube 80 that has an upper end 82, a lower end 84 and an outer wall 86 extending therebetween. The tube 80 is oriented to extend through the upper 68 and lower 70 ends of the funnel 66. Moreover, the upper end 82 of the tube 80 is spaced from the upper end 68 of the funnel 66 and the lower end 84 of the tube 80 is spaced from the lower end 70 of the funnel 66. The upper end 82 of the tube 80 insertably receives the second end 76 of the conduit 72. In this way the tube 80 receives the mixture of baby formula 28 and liquid 24. The tube 80 is urged downwardly and outwardly from the lower end 70 of the funnel 66 when the dispensing unit 78 is turned on. Additionally, the tube 80 is urged upwardly and inwardly on the lower end 70 of the funnel 66 when the dispensing unit 78 is turned off.

The dispensing unit 78 further includes a rack gear 88 that is coupled to the outer wall 86 of the tube 80 and the rack gear 88 extends from the upper end 68 of the tube 80 toward the lower end 70 of the tube 80. A dispenser motor 90 is positioned within the housing 12 and the dispenser motor 90 is electrically coupled to the control circuit 38. The dispenser motor 90 rotates in a first direction when the dispensing unit 78 is turned on and the dispenser motor 90 rotates in a second direction when the dispensing unit 78 is turned off. Moreover, the dispenser motor 90 is aligned with the tube 80 and the dispenser motor 90 may be an electric motor.

The dispensing unit 78 includes a gear 92 that is rotatably coupled to the dispenser motor 90 such that the dispenser motor 90 rotates the gear 92. The gear 92 engages the rack gear 88 on the tube 80. The tube 80 is urged downwardly when the dispenser motor 90 rotates in the first direction. Alternatively, the tube 80 is urged upwardly when the dispenser motor 90 rotates in the second direction.

A carousel 94 is provided and the carousel 94 is rotatably coupled to the housing 12. The carousel 94 is positioned in the bottle bay 14 such that the baby bottles 16 can be positioned on the carousel 94. The carousel 94 is electrically coupled to the control circuit 38 and the carousel 94 sequentially rotates a pre-determined degree of rotation. In this way the carousel 94 aligns each of the baby bottles 16 with the dispensing unit 78. Moreover, the carousel 94 advances in rotation each time one of the baby bottles 16 is filled with the mixture of baby formula 28 and liquid 24. The control circuit 38 stores pre-determined operational parameters for controlling the rotation of the carousel 94.

The carousel 94 comprises a carousel motor 96 that is positioned within the housing 12. The carousel motor 96 is electrically coupled to the control circuit 38 and the carousel motor 96 is positioned beneath the lower bounding surface 30 of the bottle bay 14. Additionally, the carousel motor 96 may be an electric motor or the like. A shaft 98 is rotatably coupled to the carousel motor 96 such that the shaft 98 is rotated when the carousel motor 96 is turned on. The shaft 98 extends upwardly through the lower bounding surface 30 of the bottle bay 14 and the shaft 98 has a distal end 100 that is exposed in the bottle bay 14.

The carousel 94 includes a disk 102 that has a bottom side 104 and a top side 106. The bottom side 104 is coupled to the distal end 100 of the shaft 98 having the disk 102 lying on a horizontal plane. The top side 106 has a plurality of wells 108 each extending downwardly toward the bottom side 104. Each of the wells 108 can insertably receive a respective one of the baby bottles 16 to inhibit the baby bottles 16 from tipping over when the disk 102 rotates. The wells 108 are distributed around an entire circumference of the disk 102. Moreover, each of the wells 108 is sequentially aligned with the dispensing unit 78 when the carousel motor 96 is turned on to rotate a pre-determined amount of time. In this way the disk 102 sequentially aligns each of the baby bottles 16 with the dispensing unit 78.

A control panel 110 is coupled to the housing 12 and the control panel 110 is manipulated by a user for operating the assembly. The control panel 110 is electrically coupled to the control circuit 38 for controlling operational parameters of the carousel 94, the dispensing unit 78, the pump 60 and the heating element 44. Additionally, the control panel 110 may comprise a touch screen or other type of electronic control.

A transceiver 112 is coupled to the housing 12 and the transceiver 112 is electrically coupled to the control circuit 38. The transceiver 112 is in wireless electrical communication with an electronic device 114 such that the electronic device 114 remotely controls the control circuit 38. The electronic device 114 may be a smart phone or the like and the smart phone may store an app for controlling the control circuit 38. The transceiver 112 may be a radio frequency transceiver or the like and the transceiver 112 may employ Bluetooth communication protocols. As is most clearly shown in FIG. 5, a remote control 111 may be provided and the remote control 111 may be a wireless remote control of any conventional design. The remote control 111 may be in wireless communication with the transceiver 112.

A power cord 113 is coupled to and extends away from the housing 12 and the power cord 113 is electrically coupled to the control circuit 38. The power cord 113 has a distal end 116 with respect to the housing 12 and a male plug 118 is electrically coupled to the distal end 116 of the power cord 113. The male plug 118 can be electrically coupled to a power source 120 comprising a female electrical outlet.

In use, the liquid reservoir 40 is filled with the liquid 24 and the formula reservoir 46 is filled with the baby formula 28. The baby bottles 16 are each positioned in a respective one of the wells 108 in the disk 102 and the control panel 110 is manipulated to enter the operational parameters, which include but are not limited to, the number of baby bottles 16 and the fluid capacity of the baby bottles 16. The control circuit 38 actuates each of the liquid valve 50 and the formula valve 52 to open for pre-determined amounts of time to achieve a mixture ratio determined in the operational parameters. The carousel 94 rotates to align each of the baby bottles 16 with the funnel 66, the tube 80 is lowered into the baby bottle 16 and the pump 60 is turned on to pump 60 a preferred amount of the mixture of liquid 24 and formula into the baby bottle 16. The tube 80 is raised out of the baby bottle 16, the carousel 94 rotates the next baby bottle 16 beneath the funnel 66 and the filling process is repeated until all of the baby bottles 16 have been filled.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A baby formula mixing assembly being configured to mix a plurality of bottles of baby formula, said assembly comprising:

a housing having a bottle bay therein wherein said bottle bay is configured to have a plurality of baby bottles positioned therein, said housing having a liquid opening and a formula opening;

a control circuit being coupled to said housing;

a liquid reservoir being positioned within said housing, said liquid reservoir being aligned with said liquid opening wherein said liquid reservoir is configured to contain the liquid;

a formula reservoir being positioned within said housing, said formula reservoir being aligned with said formula opening wherein said formula reservoir is configured to contain the formula;

a mixing chute being positioned within said housing wherein said mixing chute is configured to receive the selected amount of formula and the selected amount of liquid for mixing together;

a pump being positioned within said housing, said pump being electrically coupled to said control circuit, said pump being fluidly coupled to said mixing chute, said pump urging the mixture of formula and liquid outwardly through said pump when said pump is turned on;

a funnel being coupled to said housing, said funnel being directed into said bottle bay wherein said funnel is configured to be aligned with the baby bottles;

a dispensing unit being movably positioned in said funnel, said dispensing unit being electrically coupled to said control circuit, said dispensing unit being in fluid communication with said pump wherein said dispensing unit is configured to receive the mixture of formula and liquid, said dispensing unit being turned on to extend downwardly from said funnel wherein said dispensing unit is configured to enter the baby bottle aligned with said funnel for filling the baby bottle with the mixture of formula and liquid, said dispensing unit being turned off to retract upwardly into said funnel; and a carousel being rotatably coupled to said housing, said carousel being positioned in said bottle bay wherein said carousel is configured to have the baby bottles positioned thereon, said carousel being electrically coupled to said control circuit, said carousel sequentially rotating a pre-determined degree of rotation wherein said carousel is configured to align each of the baby bottles with said dispensing unit, said carousel advancing in rotation each time one of the baby bottles is filled with the mixture of formula and liquid.

2. The baby formula mixing assembly according to claim 1, wherein:

said housing has a front wall and a top wall, said bottle bay extending into said front wall, said bottle bay having a lower bounding surface and an upper bounding surface;

said liquid opening extends through said top wall and into an interior of said housing wherein said liquid opening is configured to have liquid poured therethrough; and said formula opening extends through said top wall and into said interior of said housing wherein said formula opening is configured to have baby formula poured therethrough.

3. The baby formula mixing assembly according to claim 2, further comprising:
a liquid lid being hingedly coupled to said top wall of said housing, said liquid lid being aligned with said liquid opening for opening and closing said liquid opening; and
a formula lid being hingedly coupled to said top wall of said housing, said formula lid being aligned with said formula opening for opening and closing said formula opening.

4. The baby formula mixing assembly according to claim 2, further comprising a heating element being coupled to said liquid reservoir, said heating element being in thermal communication with said liquid reservoir, said heating element being electrically coupled to said control circuit, said heating element heating said liquid reservoir when said heating element is turned on wherein said heating element is configured to heat the liquid in said liquid reservoir.

5. The baby formula mixing assembly according to claim 4, wherein:
said liquid reservoir has an output; and
said assembly further comprises a liquid valve being fluidly coupled to said output of said liquid reservoir, said liquid valve being electrically coupled to said control circuit, said liquid valve being in a normally closed state wherein said liquid valve is configured to retain the liquid in said liquid reservoir, said liquid valve being turned on to open for a pre-determined amount of time wherein said liquid valve is configured to release a selected amount of the liquid from said liquid reservoir.

6. The baby formula mixing assembly according to claim 5, wherein:
said formula reservoir has an output; and
said assembly further comprises a formula valve being fluidly coupled to said output of said formula reservoir, said formula valve being electrically coupled to said control circuit, said formula valve being in a normally closed state wherein said formula valve is configured to retain the formula in said formula reservoir, said formula valve being turned on to open for a pre-determined amount of time wherein said formula valve is configured to release a selected amount of the formula from said formula reservoir.

7. The baby formula mixing assembly according to claim 6, wherein:
said mixing chute has an inlet and an outlet, said mixing chute tapering between said inlet and said outlet, said inlet being aligned with each of said liquid valve and said formula valve; and
said pump has an input and an output, said input being fluidly coupled to said outlet of said mixing chute, said pump urging the mixture of formula and liquid outwardly through said output of said pump when said pump is turned on.

8. The baby formula mixing assembly according to claim 7, Wherein said funnel has an upper end and a lower end, said upper end being positioned on said upper bounding surface of said bottle bay having said lower end being directed downwardly.

9. The baby formula mixing assembly according to claim 8, further comprising a conduit having a first end and a second end, said conduit being positioned within said housing, said first end being fluidly coupled to said output of said pump, said second end being spaced from said upper end of said funnel wherein said conduit is configured to direct the mixture of formula and liquid to said funnel.

10. The baby formula mixing assembly according to claim 9, wherein said dispensing unit comprises a tube having an upper end, a lower end and an outer wall extending therebetween, said tube being oriented to extend through said upper and lower ends of said funnel, said upper end of said tube being spaced from said upper end of said funnel, said lower end of said tube being spaced from said lower end of said funnel, said upper end of said tube insertably receiving said second end of said conduit wherein said tube is configured to receive the mixture of formula and liquid, said tube being urged downwardly and outwardly from said lower end of said funnel when said dispensing unit is turned on, said tube being urged upwardly and inwardly on said lower end of said funnel when said dispensing unit is turned off.

11. The baby formula mixing assembly according to claim 10, wherein said dispensing unit further comprises:
a rack gear being coupled to said outer wall of said tube, said rack gear extending from said upper end of said tube toward said lower end of said tube;
a dispenser motor being positioned within said housing, said dispenser motor being electrically coupled to said control circuit, said dispenser motor rotating in a first direction when said dispensing unit is turned on, said dispenser motor rotating in a second direction when said dispensing unit is turned off, said dispenser motor being aligned with said tube; and
a gear being rotatably coupled to said dispenser motor such that said dispenser motor rotates said gear, said gear engaging said rack gear on said tube, said tube being urged downwardly when said dispenser motor rotates in said first direction, said tube being urged upwardly when said dispenser motor rotates in said second direction.

12. The baby formula mixing assembly according to claim 2, wherein said carousel comprises:
a carousel motor being positioned within said housing, said carousel motor being electrically coupled to said control circuit, said carousel motor being positioned beneath said lower bounding surface of said bottle bay;
a shaft being rotatably coupled to said carousel motor such that said shaft is rotated when said carousel motor is turned on, said shaft extending upwardly through said lower bounding surface of said bottle bay, said shaft having a distal end being exposed in said bottle bay;
a disk having a bottom side and a top side, said bottom side being coupled to said distal end of said shaft having said disk lying on a horizontal plane; and
said top side having a plurality of wells each extending downwardly toward said bottom side wherein each of said wells is configured to insertably receive a respective one of the baby bottles, said wells being distributed around an entire circumference of said disk, each of said wells being sequentially aligned with said dispensing unit when said carousel motor is turned on to rotate a pre-determined amount of time wherein said disk is configured to sequentially align each of the baby bottles with said dispensing unit.

13. The baby formula mixing assembly according to claim 1, further comprising a control panel being coupled to said housing wherein said control panel is configured to be manipulated, said control panel being electrically coupled to said control circuit for controlling operational parameters of said carousel, said dispensing unit, said pump and said heating coil.

14. The baby formula mixing assembly according to claim 13, further comprising a transceiver being coupled to said housing, said transceiver being electrically coupled to said control circuit, said transceiver being in wireless electrical communication with an electronic device such that the electronic device remotely controls said control circuit.

15. The baby formula mixing assembly according to claim 14, further comprising a power cord being coupled to and extending away from said housing, said power cord being electrically coupled to said control circuit, said power cord having a distal end with respect to said housing, said distal end of said power cord having a male plug being electrically coupled thereto wherein said male plug is configured to be electrically coupled to a power source comprising a female electrical outlet.

16. A baby formula mixing assembly being configured to mix a plurality of bottles of baby formula, said assembly comprising:

a housing having a bottle bay therein wherein said bottle bay is configured to have a plurality of baby bottles positioned therein, said housing having a front wall and a top wall, said bottle bay extending into said front wall, said top wall having a liquid opening extending into an interior of said housing wherein said liquid opening is configured to have liquid poured therethrough, said top wall having a formula opening extending into said interior of said housing wherein said formula opening is configured to have baby formula poured therethrough, said bottle bay having a lower bounding surface and an upper bounding surface;

a liquid lid being hingedly coupled to said top wall of said housing, said liquid lid being aligned with said liquid opening for opening and closing said liquid opening;

a formula lid being hingedly coupled to said top wall of said housing, said formula lid being aligned with said formula opening for opening and closing said formula opening;

a control circuit being coupled to said housing;

a liquid reservoir being positioned within said housing, said liquid reservoir being aligned with said liquid opening wherein said liquid reservoir is configured to contain the liquid, said liquid reservoir having an output;

a heating element being coupled to said liquid reservoir, said heating element being in thermal communication with said liquid reservoir, said heating element being electrically coupled to said control circuit, said heating element heating said liquid reservoir when said heating element is turned on wherein said heating element is configured to heat the liquid in said liquid reservoir;

a formula reservoir being positioned within said housing, said formula reservoir being aligned with said formula opening wherein said formula reservoir is configured to contain the formula, said formula reservoir having an output;

a liquid valve being fluidly coupled to said output of said liquid reservoir, said liquid valve being electrically coupled to said control circuit, said liquid valve being in a normally closed state wherein said liquid valve is configured to retain the liquid in said liquid reservoir, said liquid valve being turned on to open for a pre-determined amount of time wherein said liquid valve is configured to release a selected amount of the liquid from said liquid reservoir;

a formula valve being fluidly coupled to said output of said formula reservoir, said formula valve being electrically coupled to said control circuit, said formula valve being in a normally closed state wherein said formula valve is configured to retain the formula in said formula reservoir, said formula valve being turned on to open for a pre-determined amount of time wherein said formula valve is configured to release a selected amount of the formula from said formula reservoir;

a mixing chute being positioned within said housing, said mixing chute having an inlet and an outlet, said mixing chute tapering between said inlet and said outlet, said inlet being aligned with each of said liquid valve and said formula valve wherein said mixing chute is configured to receive the selected amount of formula and the selected amount of liquid for mixing together;

a pump being positioned within said housing, said pump being electrically coupled to said control circuit, said pump having an input and an output, said input being fluidly coupled to said outlet of said mixing chute, said pump urging the mixture of formula and liquid outwardly through said output of said pump when said pump is turned on;

a funnel being coupled to said housing, said funnel being directed into said bottle bay wherein said funnel is configured to be aligned with the baby bottles, said funnel having an upper end and a lower end, said upper end being positioned on said upper bounding surface of said bottle bay having said lower end being directed downwardly;

a conduit having a first end and a second end, said conduit being positioned within said housing, said first end being fluidly coupled to said output of said pump, said second end being spaced from said upper end of said funnel wherein said conduit is configured to direct the mixture of formula and liquid to said funnel;

a dispensing unit being movably positioned in said funnel, said dispensing unit being electrically coupled to said control circuit, said dispensing unit being in fluid communication with said pump wherein said dispensing unit is configured to receive the mixture of formula and liquid, said dispensing unit being turned on to extend downwardly from said funnel wherein said dispensing unit is configured to enter the baby bottle aligned with said funnel for filling the baby bottle with the mixture of formula and liquid, said dispensing unit being turned off to retract upwardly into said funnel, said dispensing unit comprising:

a tube having an upper end, a lower end and an outer wall extending therebetween, said tube being oriented to extend through said upper and lower ends of said funnel, said upper end of said tube being spaced from said upper end of said funnel, said lower end of said tube being spaced from said lower end of said funnel, said upper end of said tube insertably receiving said second end of said conduit wherein said tube is configured to receive the mixture of formula and liquid, said tube being urged downwardly and outwardly from said lower end of said funnel when said dispensing unit is turned on, said tube being urged upwardly and inwardly on said lower end of said funnel when said dispensing unit is turned off;

a rack gear being coupled to said outer wall of said tube, said rack gear extending from said upper end of said tube toward said lower end of said tube;

a dispenser motor being positioned within said housing, said dispenser motor being electrically coupled to said control circuit, said dispenser motor rotating in a first direction when said dispensing unit is turned on, said dispenser motor rotating in a second direction when said dispensing unit is turned off, said dispenser motor being aligned with said tube; and a gear being rotatably coupled to said dispenser motor such that said dispenser motor rotates said gear, said gear engaging said rack gear on said tube, said tube being urged downwardly when said dispenser motor rotates in said first direction, said tube being urged upwardly when said dispenser motor rotates in said second direction;

a carousel being rotatably coupled to said housing, said carousel being positioned in said bottle bay wherein said carousel is configured to have the baby bottles positioned thereon, said carousel being electrically coupled to said control circuit, said carousel sequentially rotating a pre-determined degree of rotation wherein said carousel is configured to align each of the baby bottles with said dispensing unit, said carousel advancing in rotation each time one of the baby bottles is filled with the mixture of formula and liquid, said carousel comprising:

a carousel motor being positioned within said housing, said carousel motor being electrically coupled to said control circuit, said carousel motor being positioned beneath said lower bounding surface of said bottle bay;

a shaft being rotatably coupled to said carousel motor such that said shaft is rotated when said carousel motor is turned on, said shaft extending upwardly through said lower bounding surface of said bottle bay, said shaft having a distal end being exposed in said bottle bay; and a disk having a bottom side and a top side, said bottom side being coupled to said distal end of said shaft having said disk lying on a horizontal plane, said top side having a plurality of wells each extending downwardly toward said bottom side Wherein each of said wells is configured to insertably receive a respective one of the baby bottles, said wells being distributed around an entire circumference of said disk, each of said wells being sequentially aligned with said dispensing unit when said carousel motor is turned on to rotate a pre-determined amount of time Wherein said disk is configured to sequentially align each of the baby bottles with said dispensing unit;

a control panel being coupled to said housing wherein said control panel is configured to be manipulated, said control panel being electrically coupled to said control circuit for controlling operational parameters of said carousel, said dispensing unit, said pump and said heating coil;

a transceiver being coupled to said housing, said transceiver being electrically coupled to said control circuit, said transceiver being in wireless electrical communication with an electronic device such that the electronic device remotely controls said control circuit; and a power cord being coupled to and extending away from said housing, said power cord being electrically coupled to said control circuit, said power cord having a distal end with respect to said housing, said distal end of said power cord having a male plug being electrically coupled thereto wherein said male plug is configured to be electrically coupled to a power source comprising a female electrical outlet.

* * * * *